United States Patent
Takeda

(10) Patent No.: US 7,641,270 B2
(45) Date of Patent: Jan. 5, 2010

(54) CAR BODY FRAME MEMBER

(75) Inventor: Riki Takeda, Atsugi (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 118 days.

(21) Appl. No.: 11/896,694

(22) Filed: Sep. 5, 2007

(65) Prior Publication Data

US 2008/0054683 A1 Mar. 6, 2008

(30) Foreign Application Priority Data

Sep. 6, 2006 (JP) ............................ 2006-241847

(51) Int. Cl.
 *B60N 99/00* (2006.01)
(52) U.S. Cl. .............................. 296/203.02; 296/193.09
(58) Field of Classification Search ............ 296/193.05, 296/193.09, 203.01, 203.02, 203.03; 293/132, 293/133
 See application file for complete search history.

(56) References Cited

U.S. PATENT DOCUMENTS

| 6,874,843 B2 * | 4/2005 | Awano et al. | ........... 296/203.02 |
|---|---|---|---|
| 7,097,235 B2 | 8/2006 | Yasukouchi et al. | |
| 2005/0082878 A1 | 4/2005 | Yamada et al. | |
| 2005/0151392 A1 | 7/2005 | Yasukouchi et al. | |
| 2006/0170206 A1 * | 8/2006 | Mitsui et al. | ................. 280/797 |

FOREIGN PATENT DOCUMENTS

| GB | 2 326 853 A | 1/1999 |
|---|---|---|
| JP | 7-187002 A | 7/1995 |
| JP | 61-016974 U | 1/1996 |
| JP | 9-315344 A | 12/1997 |
| JP | 2002-337730 A | 11/2002 |
| JP | 2005-199751 A | 7/2005 |
| JP | 2007-112260 A | 5/2007 |

* cited by examiner

*Primary Examiner*—Lori L Lyjak
(74) *Attorney, Agent, or Firm*—Foley & Lardner LLP

(57) ABSTRACT

In a car body frame member that couples a front side member and an extension member to each other, a portion thereof extending from a rear portion of the front side member to the extension member is formed as a bent portion that is smoothly curved and inclined downward. A side surface that is continuously extending from the bent portion to the front side member as a straight portion of the car body frame member is continuously formed with a reinforcing bead.

4 Claims, 5 Drawing Sheets

CAR BODY FRAME MEMBER

BACKGROUND OF THE INVENTION

1. Field of the Invention

The present invention relates to a car body frame member forming a portion of a car body frame.

2. Description of the Related Art

A conventional front side member as a car body frame member extends in a longitudinal direction of a vehicle on opposite sides in a widthwise direction of the vehicle of a front portion of the car body (e.g., an engine room). A rear portion of the front side member is continuously connected to an extension member extending downward along a dash panel lower. A portion of the front side member connected to an extension member is a smoothly inclining bent portion. A bead is continuously formed in a height direction on a substantially central portion of a side surface of the front side member in the height direction, and the rigidity of the member is enhanced by the bead (Japanese Patent Application Laid-open No. 2005-199751).

However, in this front side member, the bead that is formed in a length direction of the side surface is discontinued at a location before the front side member is connected to the extension member, i.e., at a rear portion of a straight portion of the front side member.

For this reason, when a collision load is applied from a front portion of the front side member, since the straight portion is formed with the bead, the straight portion can secure sufficient rigidity. However, the bent portion connected to the extension member is not formed with the bead, the cross-sectional proof stress of the bent portion is lowered and it is difficult for the bent portion to secure a necessary flexural rigidity although a great bending moment is applied to the bent portion.

However, to secure the cross-sectional proof stress of the bent portion, if the thickness of the extension member is increased or a reinforcing member is newly provided, the weight of the car body is adversely increased.

SUMMARY OF THE INVENTION

It is therefore an object of the present invention to obtain a car body frame member capable of enhancing the cross-sectional proof stress of the bent portion and reducing the weight of the car body.

A main aspect of the present invention is to provide a car body frame member including a straight portion having a closed cross section, and a bent portion that is continuous with the straight portion and that is inclined with respect to the straight portion, wherein a side surface of the straight portion and the bent portion are formed with reinforcing beads that are continuously formed from the straight portion to the bent portion.

DETAILED DESCRIPTION OF THE PREFERRED EMBODIMENTS

Figure 1:
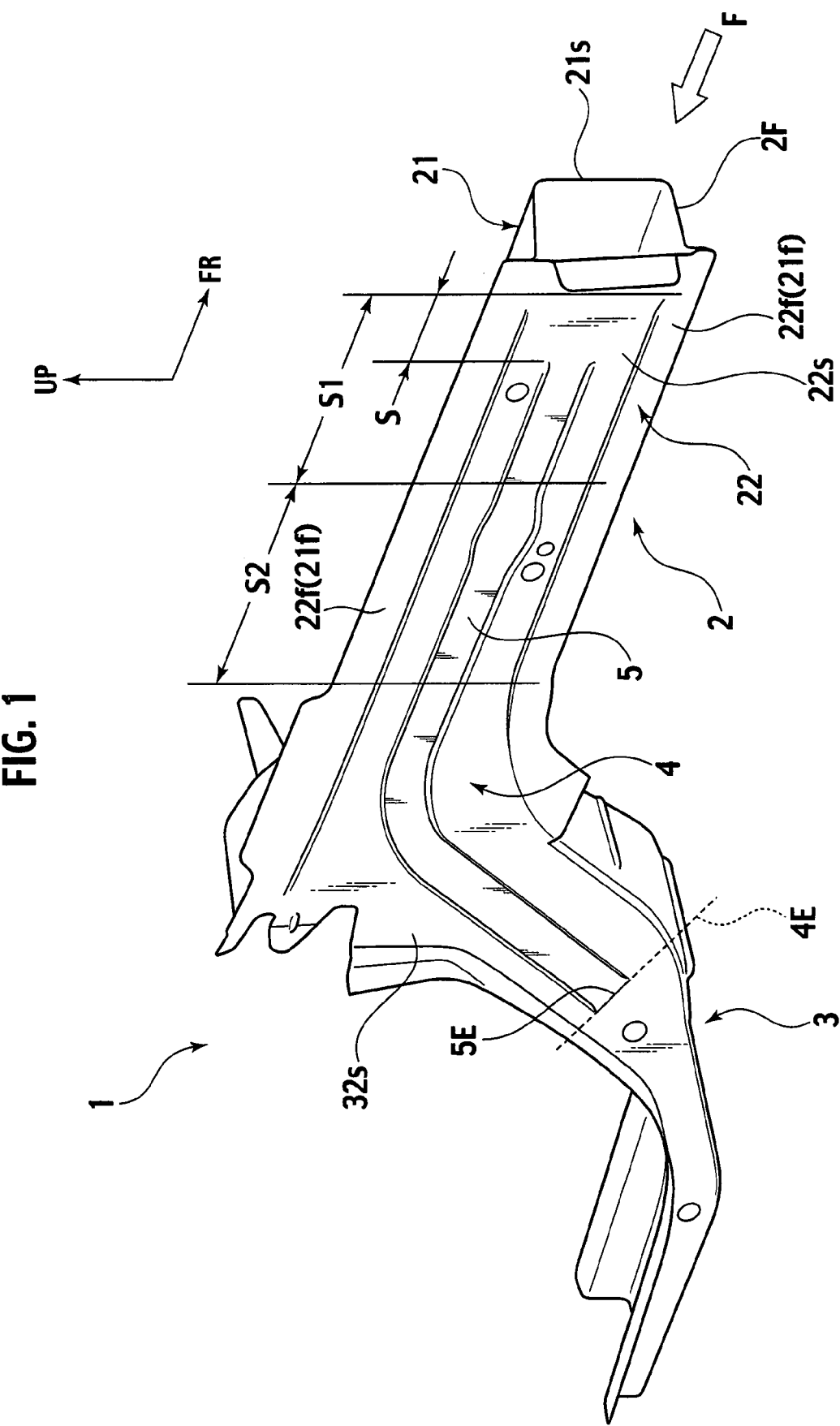
FIG. 1 is a perspective view showing an assembled state of a car body frame member according to an embodiment of the present invention.
Figure 2:
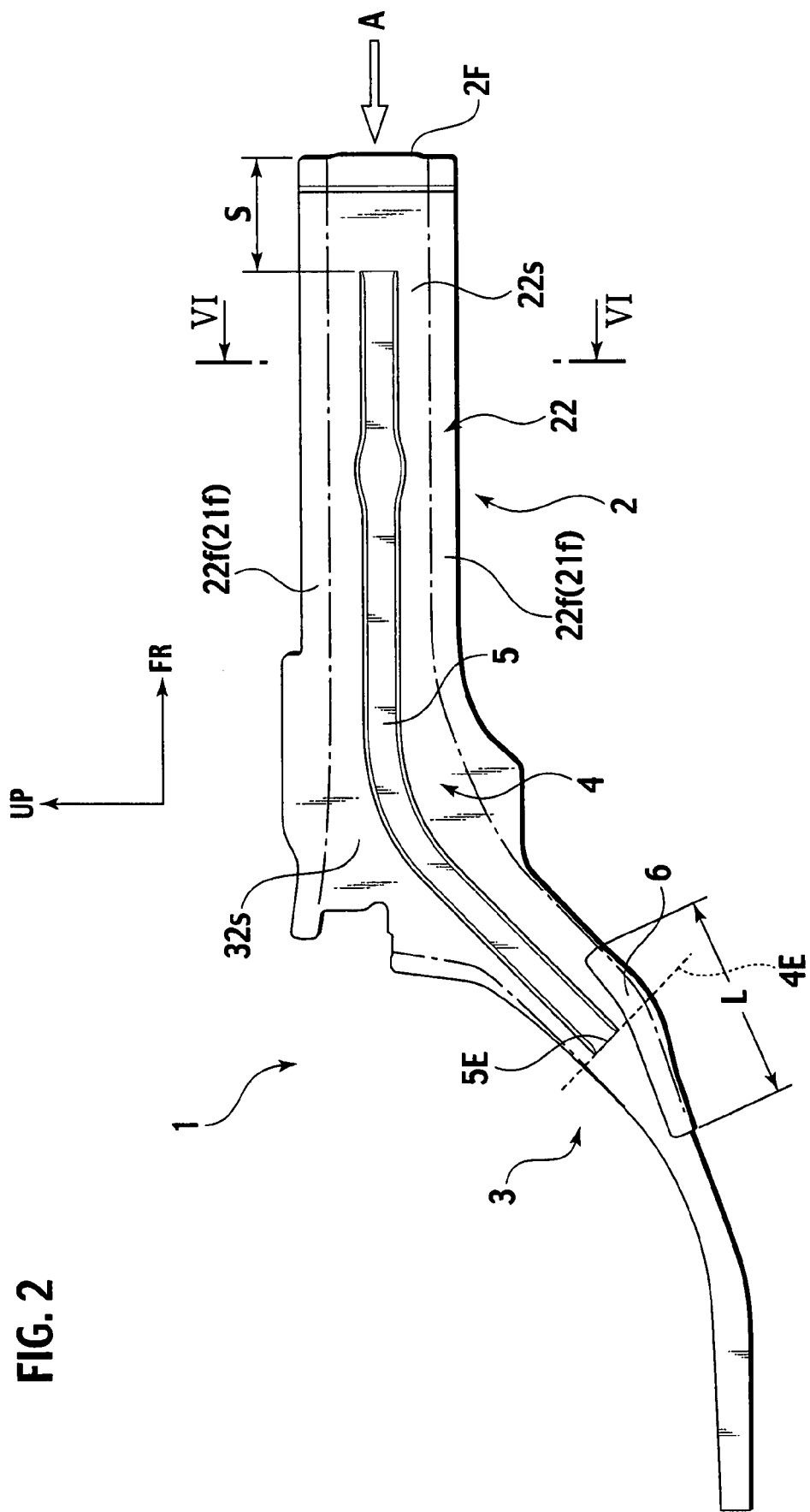
FIG. 2 is a side view of the car body frame member according to the embodiment.

A preferred embodiment of the present invention will be explained below in detail with reference to the accompanying drawings. FIG. 1 is a perspective view showing an assembled state of a car body frame member. FIG. 2 is a side view of the car body frame member. In the drawings, FR represents vehicle front, and UP represents an upward direction.

As shown in FIGS. 1 and 2, the car body frame member 1 according to the embodiment is a connecting portion between a front side member 2 and an extension member 3.

The front side member 2 straightly extends in a longitudinal direction of the vehicle on opposite sides of a front portion of a car body in a widthwise direction of the vehicle. The front side member 2 corresponds to a straight portion of the invention. At the time of a head-on collision of the vehicle, a collision load from front is applied in an extending direction of the front side member 2 from a front portion of the front side member 2.

The extension member 3 is coupled to a rear portion (left side in FIG. 2) of the front side member 2. The extension member 3 is downwardly inclined along a lower side of a dash panel lower (not shown). The rear portion (left side in FIG. 2) of the extension member 3 is located below the front portion. A portion of the frame extending from the rear portion of the front side member 2 to the extension member 3 is a bent portion 4. The bent portion 4 is smoothly curved downward, i.e., inclined in a direction intersecting with an application direction of the collision load.

Figure 3:
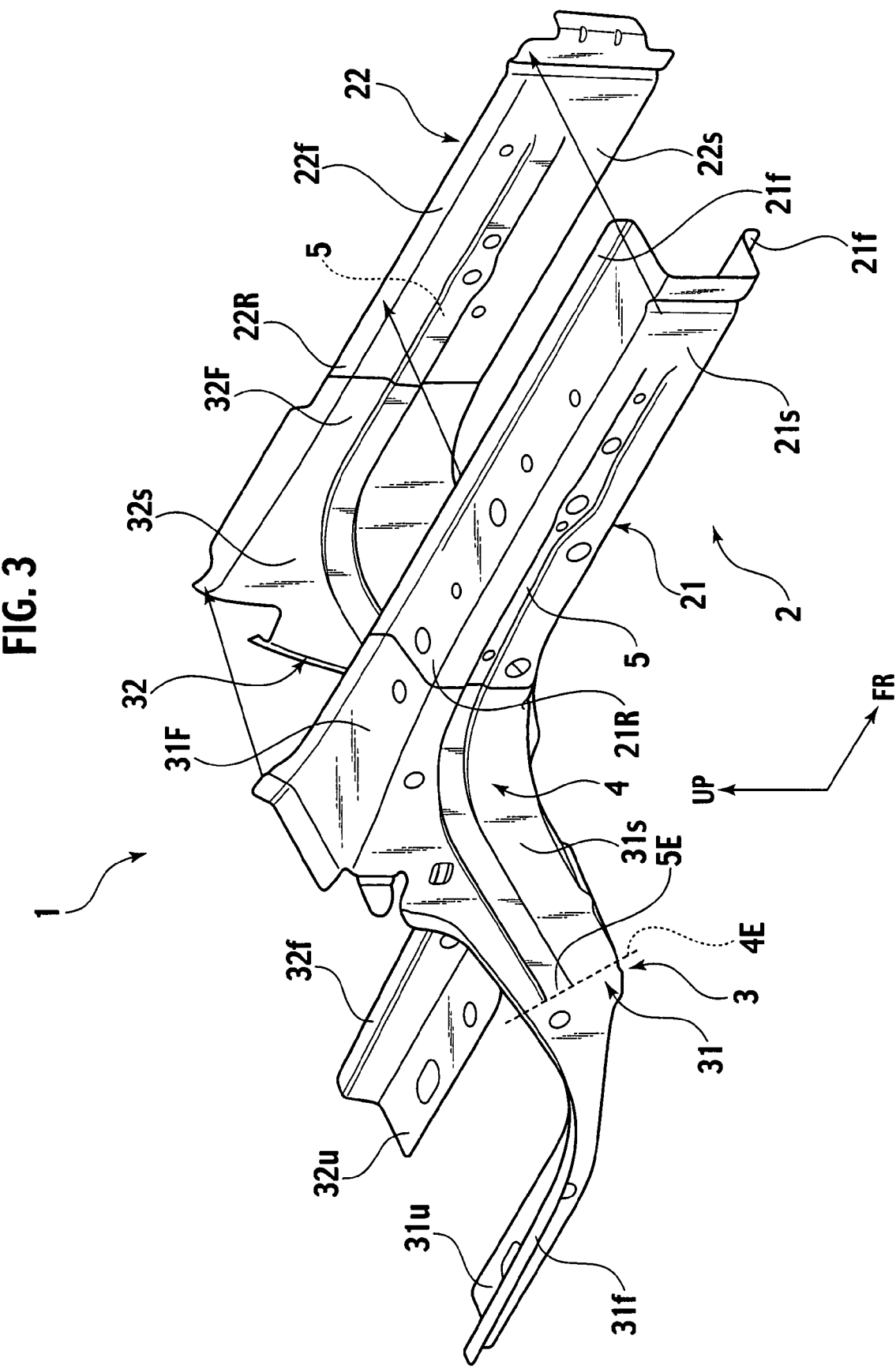
FIG. 3 is an exploded perspective view of the car body frame member according to the embodiment as viewed from front of the vehicle.
Figure 4:
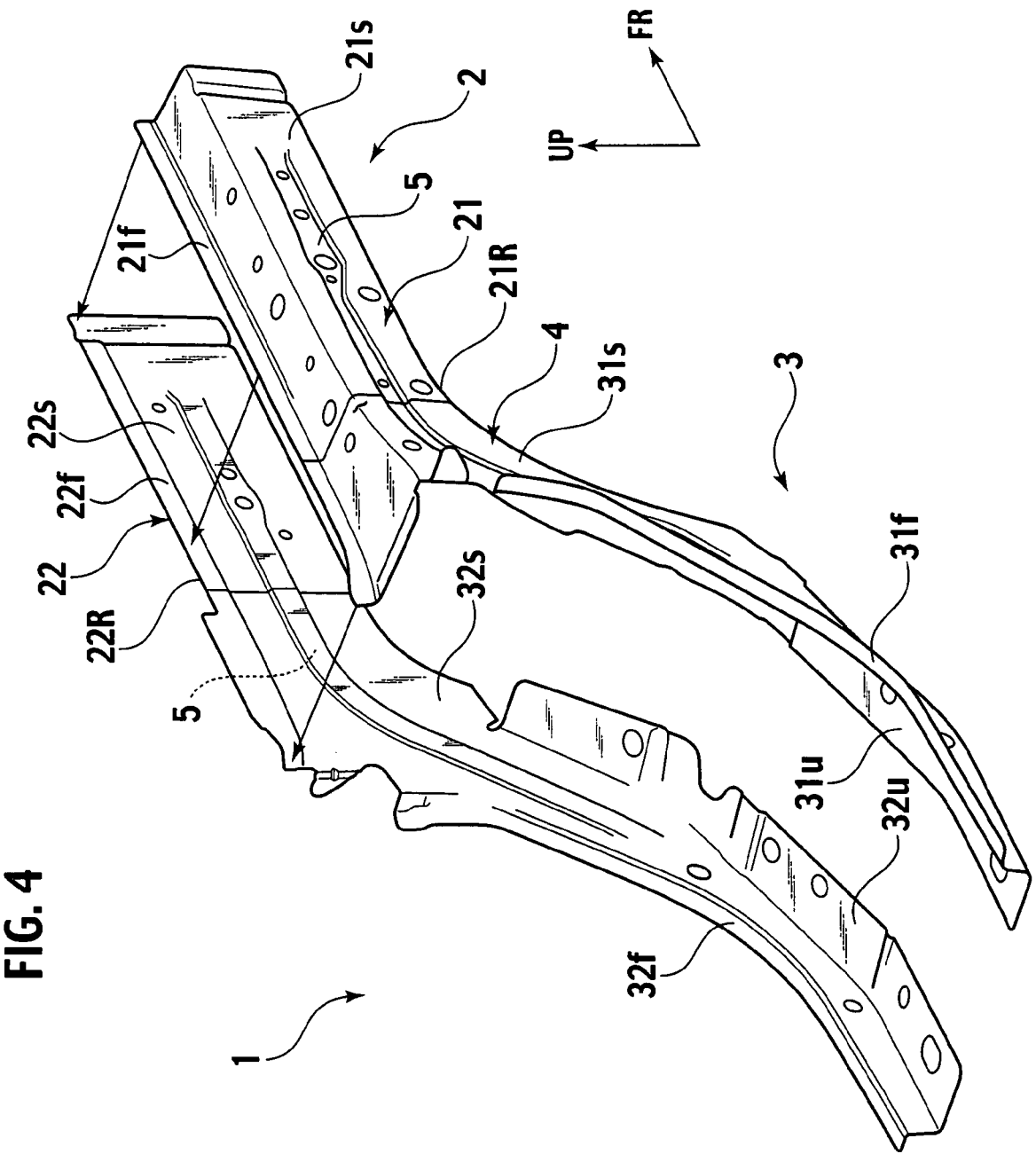
FIG. 4 is an exploded perspective view of the car body frame member according to the embodiment as viewed from rear of the vehicle.
Figure 5:
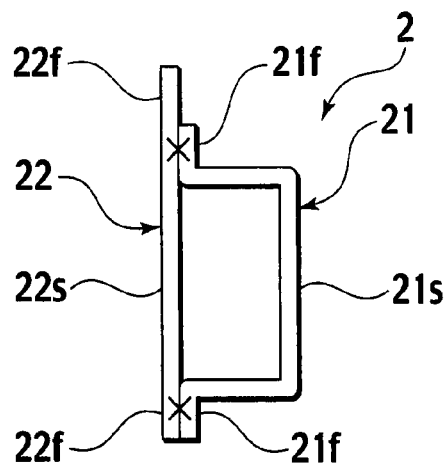
FIG. 5 is an end view as viewed from a direction A in FIG. 2.
Figure 6:
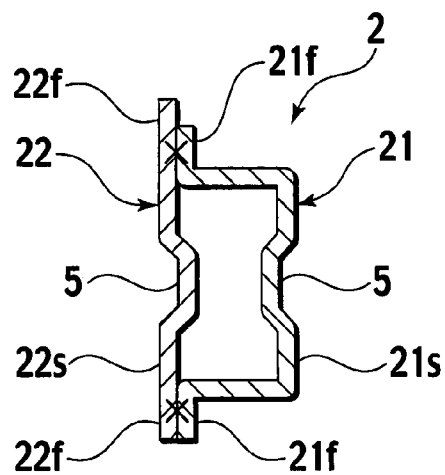
FIG. 6 is a sectional view taken along a line VI-VI in FIG. 2.

FIG. 3 is an exploded perspective view of the car body frame member. FIG. 4 is an exploded perspective view of the car body frame member as viewed from rear of the vehicle. FIG. 5 is an end view as viewed from a direction A in FIG. 2. FIG. 6 is a sectional view taken along a line VI-VI in FIG. 2.

As shown in FIGS. 3 and 4, the front side member 2 includes a side member inner plate 21 having a substantially hat-like cross section, and a side member outer plate 22 having a substantially flat band-like shape. The side member inner plate 21 and the side member outer plate 22 are bonded to each other. The side member inner plate 21 is provided at its upper and lower ends with flanges 21f. The side member outer plate 22 is provided at its upper and lower ends with flanges 22f. The side member inner plate 21 and the side member outer plate 22 constitute a closed cross section structure by bonding the flanges 21f and 22f to each other as shown in FIGS. 5 and 6.

For convenience sake, the car body frame member 1 disposed on the starboard side of the vehicle is shown in FIGS. 1 and 2, and the car body frame member 1 disposed on the port side of the car body is shown in FIGS. 3 and 4. The car body frame member 1 disposed on the starboard side and the port side are symmetric to each other with respect to the center line of the car body.

Meanwhile, as shown in FIGS. 3 and 4, the extension member 3 includes an extension inner plate 31 and an extension outer plate 32. The extension inner plate 31 and the extension outer plate 32 are integrally bonded to rear ends 21R and 22R of the side member inner plate 21 and the side member outer plate 22.

Front ends 31F and 32F of the extension inner plate 31 and the extension outer plate 32 are continuously connected to the side member inner plate 21 and the side member outer plate 22. Cross sections of portions of the front ends 31F and 32F reaching a rear portion of the vehicle are formed into substantially L-shapes by side surfaces 31s and 32s and bottom surfaces 31u and 32u. Here, the side surfaces 31s and 32s are connected to side surfaces 21s and 22s of the side member inner plate 21 and the side member outer plate 22. The bottom surfaces 31u and 32u are bent from lower sides of the side surfaces 31s and 32s in directions opposed to each other.

Upper sides of the side surfaces 31s and 32s of the extension inner plate 31 and the extension outer plate 32 are formed with the flanges 31f and 32f. By bonding the flanges 31f and 32f to a lower surface of the dash panel lower (not shown), a closed cross section is formed.

In the present embodiment, reinforcing beads 5 are formed on side surfaces 21s and 31s as well as 22s and 32s. The beads 5 are continuously formed from the front side member 2 that is the straight portion of the car body frame member 1 to the bent portion 4.

As shown in FIG. 6, the beads 5 are formed by recessing substantially central portions of both side surfaces 21s and 22s of the front side member 2 and both side surfaces 31s and 32s of the extension member 3 in their height directions inward of the closed cross section. As shown in FIGS. 1 and 2, the bead 5 is continuously formed from a front portion of the front side member 2, more specifically, from a portion of the front side member 2 retreated from its front end 2F by a predetermined distance S, to a terminal point 4E of the bent portion 4.

A reinforcing member 6 is provided on a portion of the extension member 3 corresponding to a forming-terminal portion 5E of the bead 5 formed on the bent portion 4. The reinforcing member 6 is coupled such as to cover a lower side of the extension member 3 over an appropriate length L to include a portion corresponding to the forming-terminal portion 5E.

According to the car body frame member 1 of the present embodiment, the reinforcing beads 5 that are continuously formed from the front side member 2 as the straight portion to the bent portion 4 are formed on the side surfaces 21s and 31s as well as 22s and 32s. Therefore, the cross-sectional proof stresses of not only the front side member 2 but also the bent portion 4 can be enhanced. Thus, when a collision load is applied to the front side member 2 from front of the vehicle, the flexural rigidity of the car body frame member 1 including the bent portion 4 can be enhanced with respect to the application of the load (see FIG. 7).

That is, if the collision load F in the extending direction is applied to the car body frame member 1, as shown in FIG. 1, a predetermined section S1 from the front end toward a rear portion of the vehicle is compressed and deformed, a predetermined section S2 located rearward from the predetermined section S1 is not deformed almost at all, and the bent portion 4 existing rearward from the section S2 is bent and deformed.

Figure 7:
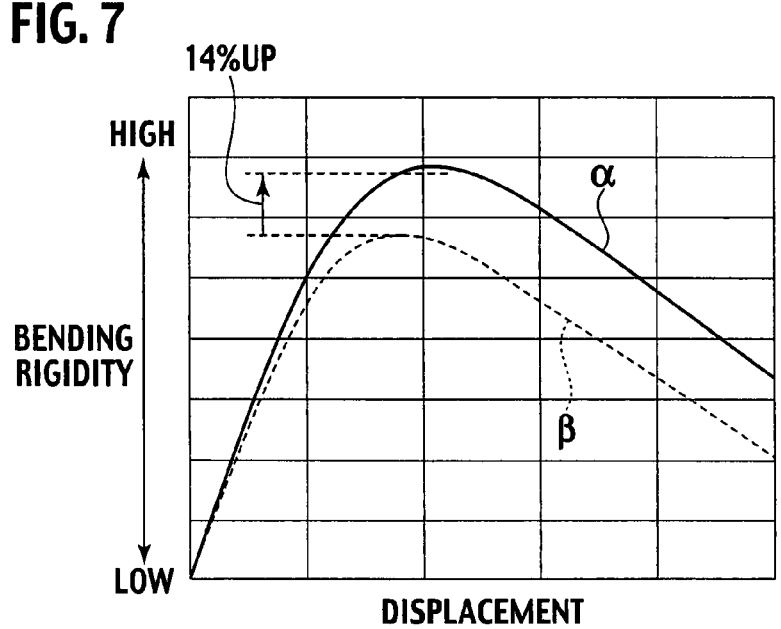
FIG. 7 is a characteristic diagram showing a flexural rigidity of the car body frame member according to the embodiment in comparison with a conventional technique.

FIG. 7 shows flexural rigidity characteristics (shown with a solid line) α of the car body frame member 1 according to the present embodiment formed with the bead 5, and flexural rigidity characteristics (shown with a broken line) β as a reference example formed with no bead 5. In FIG. 7, it can be found that the flexural rigidity of the car body frame member 1 according to the embodiment is enhanced by about 14% as compared with the reference example.

According to the car body frame member 1 of the embodiment, since the flexural rigidity is enhanced in this manner, the car body frame member 1 can be made thin. More specifically, if the thickness of the front side member 2 is set to 1.4 mm and the thickness of the extension member 3 including the bent portion 4 is set to 2.0 mm, the weight of the car body can be reduced. Thus, the weight of the car body can be reduced.

In the present embodiment, the straight portion of the car body frame member 1 is the front side member 2 and in the bent portion 4, the rear portion of the front side member 2 is coupled to the extension member 3. The beads 5 are formed in the side surfaces 21s and 22s as well as 31s and 32s at the substantially central portions in the height direction, and the side surfaces are continuously formed on the front side member 2 and the bent portion 4. Therefore, the substantially central portions of the side surfaces 21s and 22s as well as 31s and 32s in the height direction which have weak strength are effectively reinforced, and by forming the beads 5 up to the terminal portion 4E of the bent portion 4, the flexural rigidity from the front side member 2 to the extension member 3 can effectively enhanced.

Since the reinforcing member 6 is provided on the portion of the extension member 3 corresponding to the forming-terminal portion 5E of the bead 5 formed in the bent portion 4, the stress concentrated on the forming-terminal portion 5E of the bead 5 can be dispersed through the reinforcing member 6, and the flexural rigidity of the bent portion 4 can further be enhanced.

While the preferred embodiment of the present invention has been explained above, the invention is not limited thereto and various modifications can be made.

This application is based upon and claims the benefit of priority from a Japanese Patent Application No. 2006-241847, filed on Sep. 6, 2006; the entire contents of which are incorporated herein by reference.

What is claimed is:

1. A car body frame member comprising:
   a straight portion having a closed cross section, and
   a bent portion that is continuous with the straight portion and that is inclined with respect to the straight portion,
   wherein a side surface of the straight portion and the bent portion are formed with reinforcing beads that are continuously formed from the straight portion to the bent portion,
   wherein a reinforcing member is provided corresponding to a forming-terminal portion of the bead.

2. A car body frame member comprising:
   a straight portion having a closed cross section, and
   a bent portion that is continuous with the straight portion and that is inclined with respect to the straight portion,
   wherein a side surface of the straight portion and the bent portion are formed with reinforcing beads that are continuously formed from the straight portion to the bent portion,
   wherein the straight portion is a front side member extending in a longitudinal direction of a vehicle on opposite sides of a front portion of a car body in a widthwise direction of the vehicle,
   wherein the bent portion is a connecting portion between an extension member and a rear portion of the front side member,
   wherein the beads are formed in a substantially central portion of side surfaces of the front side member and the bent portion in a height direction such as to extend from a front portion of the front side member to a terminal portion of the bent portion, and wherein a reinforcing member is provided corresponding to a forming-terminal portion of the bead.

3. A car body frame member comprising:

a front side member having a closed cross section, wherein the front side member extends in a longitudinal direction of a vehicle on each side of a front portion of a car body in a widthwise direction of the vehicle;

a bent portion provided at a connecting portion between an extension member and a rear portion of the front side member, wherein the bent portion is continuous with the front side member and is inclined with respect to the front side member; and at least one reinforcing bead formed in a substantially central portion in a height direction of at least one side surface of the front side member and the bent portion, wherein the reinforcing bead is continuously formed from a front portion of the front side member to a terminal portion of the bent portion.

4. The car body frame member according to claim 3, wherein both side surfaces of the front side member and the bent portion are provided with the at least one reinforcing bead, respectively.

* * * * *